United States Patent
Gomis et al.

(10) Patent No.: US 12,065,252 B2
(45) Date of Patent: Aug. 20, 2024

(54) DEVICE FOR DISCONNECTING A LOAD-CARRYING SYSTEM BY A MECHANICAL ACTION, AND LOAD-CARRYING SYSTEM EQUIPPED WITH SUCH A DISCONNECT DEVICE

(71) Applicant: SAFRAN AEROSYSTEMS, Plaisir (FR)

(72) Inventors: Christian Gomis, Plaisir (FR); Alexandre Tharreau, Plaisir (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 779 days.

(21) Appl. No.: 17/271,780

(22) PCT Filed: Aug. 27, 2019

(86) PCT No.: PCT/FR2019/051973
§ 371 (c)(1),
(2) Date: Feb. 26, 2021

(87) PCT Pub. No.: WO2020/043987
PCT Pub. Date: May 5, 2020

(65) Prior Publication Data
US 2021/0339874 A1 Nov. 4, 2021

(30) Foreign Application Priority Data

Aug. 27, 2018 (FR) .................................... 1857686
Sep. 28, 2018 (FR) .................................... 1858981

(51) Int. Cl.
*B64D 17/30* (2006.01)
*B64D 17/38* (2006.01)

(52) U.S. Cl.
CPC ........... *B64D 17/383* (2013.01); *B64D 17/30* (2013.01)

(58) Field of Classification Search
CPC ................................. B64D 17/38; B64D 17/30
(Continued)

(56) References Cited

U.S. PATENT DOCUMENTS

| 2,405,333 A | 8/1946 | Sheridan | |
|---|---|---|---|
| 3,804,698 A * | 4/1974 | Kinloch | .................. B60R 22/28 428/176 |

(Continued)

FOREIGN PATENT DOCUMENTS

JP        2002166894 A       6/2002

OTHER PUBLICATIONS

International Search Report mailed Apr. 23, 2020, issued in corresponding International Application No. PCT/FR2019/051973, filed Aug. 27, 2019, 5 pages.

(Continued)

*Primary Examiner* — Paul T Chin
(74) *Attorney, Agent, or Firm* — CHRISTENSEN O'CONNOR JOHNSON KINDNESS PLLC

(57) ABSTRACT

A device for disconnection by a mechanical action includes at least one mechanical connection part, in particular a buckle held closed by spring action, linked to at least one trigger via at least one connecting member, and a release lever configured to be triggered by application of a force according to a predefined opening direction. The disconnect device also includes at least one guide for the connecting member configured to redirect an effort applied on the trigger, when opening is required, towards the mechanical connection part linked to the connecting member, according to the predefined opening direction.

8 Claims, 4 Drawing Sheets

(58) Field of Classification Search
USPC .................................................... 294/82.25
See application file for complete search history.

(56) References Cited

U.S. PATENT DOCUMENTS

| | | | | |
|---|---|---|---|---|
| 6,450,558 B1* | 9/2002 | Ringrose | ............... | F16B 45/021 |
| | | | | 24/600.1 |
| 6,983,913 B2* | 1/2006 | Auvray | ................... | B64D 17/38 |
| | | | | 244/151 A |
| 8,074,934 B2* | 12/2011 | Fradet | .................... | B64D 17/74 |
| | | | | 244/148 |
| 8,870,123 B2* | 10/2014 | Deazley | ................. | B64D 17/62 |
| | | | | 244/149 |
| 8,918,967 B2* | 12/2014 | Berge | ..................... | B64D 17/38 |
| | | | | 244/151 B |
| 9,242,736 B2* | 1/2016 | Fitzgerald | .............. | B64D 17/32 |
| 2010/0001140 A1 | 1/2010 | McHugh et al. | | |
| 2012/0291234 A1 | 11/2012 | Berge | | |
| 2014/0007388 A1* | 1/2014 | Hartnell | ............. | A44B 11/2542 |
| | | | | 24/633 |

OTHER PUBLICATIONS

Written Opinion mailed Apr. 23, 2020, issued in corresponding International Application No. PCT/FR2019/051973, filed Aug. 27, 2019, 5 pages.
International Preliminary Report on Patentability mailed Mar. 2, 2021, issued in corresponding International Application No. PCT/FR2019/051973, filed Aug. 27, 2019, 6 pages.

* cited by examiner

DEVICE FOR DISCONNECTING A LOAD-CARRYING SYSTEM BY A MECHANICAL ACTION, AND LOAD-CARRYING SYSTEM EQUIPPED WITH SUCH A DISCONNECT DEVICE

FIELD OF THE DISCLOSURE

The technical field of the disclosure is that of devices for disconnecting or dropping a load-carrying system and such a load-carrying system, such as a load-carrying girdle, connected to a parachute system.

BACKGROUND

A load-carrying system is connected to a parachute system thereby enabling a user to carry a payload during the different phases of a mission, in particular during a displacement on the ground and in a cargo bay of an aircraft, in free fall or during canopy piloting. Connection of the load-carrying system to the parachute system is ensured by a link between mechanical parts, such as snap-hooks, mounted on the load-carrying system and associated rings present on the parachute system.

Current connection systems of load-carrying systems may induce inadvertent disconnections and/or blockages. In addition, an action carried out in order to ensure a disconnection is often directed towards one single direction to ensure the function thereof.

In addition, depending on the mass of the load-carrying system and the mechanical connection systems that are used, the force required for disconnection may be considerable because of a transmission of efforts due to the mass of the payload held by the load-carrying system on the mechanical connection systems.

There is a need for a device for disconnection by mechanical action solving the problems of the prior art.

SUMMARY

An object of the disclosure is a device for disconnection by a mechanical action comprising at least one mechanical connection part, in particular a buckle held closed by spring action, connected to at least one triggering means via at least one connecting member, and a release lever configured to be triggered by application of a force according to a predefined opening direction,
the disconnect device also comprising at least one guide for the connecting member configured to redirect an effort applied on the triggering means, when opening is required, towards the mechanical connection part linked to the connecting member, according to the predefined direction.

The guide may be disposed in proximity to the mechanical connection part, so that the connecting member passing through the guide is collinear with the predefined opening direction in a portion comprised between the guide and the mechanical connection part.

At least two connecting members may be linked to one single triggering means.

The mechanical connection part may be a jaw snap-hook held open by spring action.

The triggering means may be a handle or a shackle.

The guide may be disposed in a plane equidistant from the mechanical connection parts.

Another object of the disclosure is a load-carrying system configured to hold a load in place relative to a harness, comprising a device for disconnection by a mechanical action allowing reversibly securing the load-carrying system and the harness.

Another object of the disclosure is a load-carrying system and an associated harness, wherein the harness is a harness of a parachute system.

The device for disconnection by mechanical action has the advantage of an opening effort that is constant and not dependent on the mass of the load-carrying system, but rather only on the characteristics of the mechanical connection part. In addition, the mechanical action may be exerted in various directions thanks to the transmission of the opening effort of the mechanical connection part by the guides which enable the user to exert a mechanical action in all directions of space.

Of course, the different features, variants and/or embodiments of the present disclosure may be associated with one another according to various combinations to the extent that these are not incompatible or exclusive of each other.

DESCRIPTION OF THE DRAWINGS

The present disclosure will be better understood and other features and advantages will come out on reading the following detailed description comprising embodiments provided for illustration with reference to the appended figures, presented as non-limiting examples, which may be used to complement the understanding of the present disclosure and the disclosure of implementation thereof and, where appropriate, contribute to the definition thereof, in which.

It should be noted that, in the figures, structural and/or functional elements that are common to the different embodiments may bear the same references. Thus, unless otherwise stated, such elements have identical structural, dimensional and material properties.

DETAILED DESCRIPTION

The present disclosure provides for an opening of a mechanical connection part, in particular a specific buckle, for example a snap-hook, in particular a spring-loaded snap-hook, actuated by a connecting member, in particular a textile element such as a robe, or of a different kind, for example a metallic cable, a chain, etc., passing within at least one guide, in particular several guides, and linked to a triggering means, in particular a gripping means, such as for example a handle or a shackle. Thus, according to the present disclosure, regardless of the direction of an activation force exerted on the triggering means, the guide, in particular the guides, transmits the effort exerted by or on the triggering means and enable opening of the mechanical connection part.

According to a particularly advantageous alternative, the present disclosure provides for the use of a mechanical connection part, in particular a specific buckle, in particular a buckle specific to opening under load, whose locking is ensured by a closure device, in particular a spring-loaded closure device. Thus, irrespective of the intensity of the load, an action on the closure device is adapted to enable unlocking thereof and also prevents inadvertent openings.

According to a particular embodiment, in the case of connection of a load-carrying system to a parachute system, two mechanical parts, such as in particular two specific buckles, are necessary, respectively on a left-side portion and a right-side portion of the parachute system. Consequently, there are two connecting members passing through respective guides and linked to the same triggering means thereby ensuring opening of the mechanical connection parts, regardless of the orientation of a mechanical action applied to the triggering means. According to a specific configuration, a selected length of the connecting members and a proper positioning of the guide(s) thus allow ensuring a simultaneous opening of the two mechanical connection parts.

Figure 1:
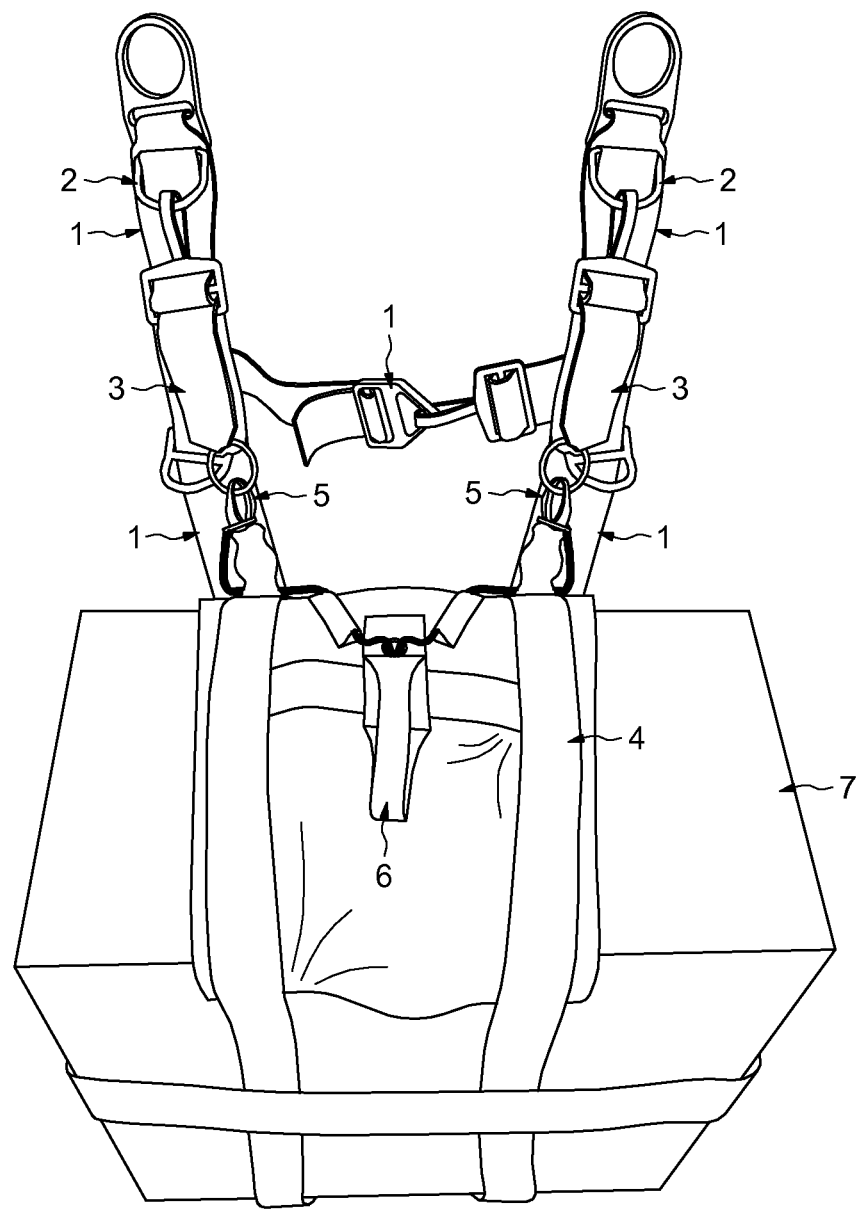
FIG. 1 illustrates a perspective front view of a load-carrying system, such as a load-carrying girdle, according to the present disclosure, adapted to be connected to a parachute system via a harness.

In FIG. 1, there is shown a harness 1, in particular of a parachute system, fitting to the body of a user comprising rings, attached for example to the risers of a parachute canopy.

The harness 1 comprises at least one first attachment point 2 on which at least one first hooking part 3 of the load-carrying system 4 can be attached. According to an advantageous embodiment, the harness 1 comprises two first attachment points 2 arranged respectively on a right-side portion and a left-side portion of the harness 1. In this alternative, a first right-side hooking part 3 of the load-carrying system 4 can be attached to the attachment point 2 of the right-side portion of the harness 1 and a first left-side hooking part 3 of the carrying system 4 can be attached to the attachment point 2 of the left-side portion of the harness 1.

Attachment of the first hooking part 3 of the load-carrying system 4 with the attachment point 2 may be done via a mechanical connection part, in particular a specific buckle, in particular a buckle specific to opening under load, whose locking is ensured by a closure device, in particular a spring-biased closure device.

At least one second attachment point, not represented in FIG. 1, allows attaching a second hooking part of the load-carrying system 4 so as to ensure stability thereof during the flight. Advantageously, two second attachment points are provided to respectively attach two second hooking parts of the load-carrying system 4 so as to ensure stability thereof, in particular during the flight and/or navigation phases, in particular via "thigh" or bottom lateral straps. In particular, the second attachment point is disposed at the bottom portion of the parachute system, in particular of the harness 1.

The load-carrying system 4 is made of a textile or plastic material and is intended to hold a load 7, in particular during the flight, via at least one holding element, such as a strap, in particular several straps, constituted for example by textile strips so as to free the hands of the user and limit the risks of impacts. In order to address some operational constraints, the load-carrying system 4 is provided with a device for opening by a mechanical action allowing releasing or dropping the carried load, in particular following an action of the user accordingly.

In the context of the present disclosure, the mechanical action allowing releasing or dropping the carried load may be a pulling force on a triggering means, in particular a gripping means, or a push action on the triggering means.

The device for disconnection by a mechanical action comprises at least one mechanical connection part 5, in particular a specific buckle 5, in particular a buckle 5 held closed by spring action, for example a snap-hook, in particular a spring-loaded snap-hook. In particular, the mechanical part 5 comprises a release lever, disposed in particular in a transverse position relative to the mechanical connection part 5, configured to release a jaw from the mechanical connection part 5 and to enable opening of the mechanical connection part 5.

For example, such a mechanical connection part 5 may be a jaw snap-hook held open by spring action, commercialized in particular by the company Wichard©.

The disconnect device also comprises a connecting member, in particular a textile element, such as a rope, or of a different kind, for example a metallic cable, a chain, etc., for each mechanical connection part 5 linked to a triggering means 6, in particular the gripping means 6. In a preferred embodiment, the connecting members are linked to one single triggering means 6, but alternatively they may also be linked to a respective triggering means 6.

Figure 2:
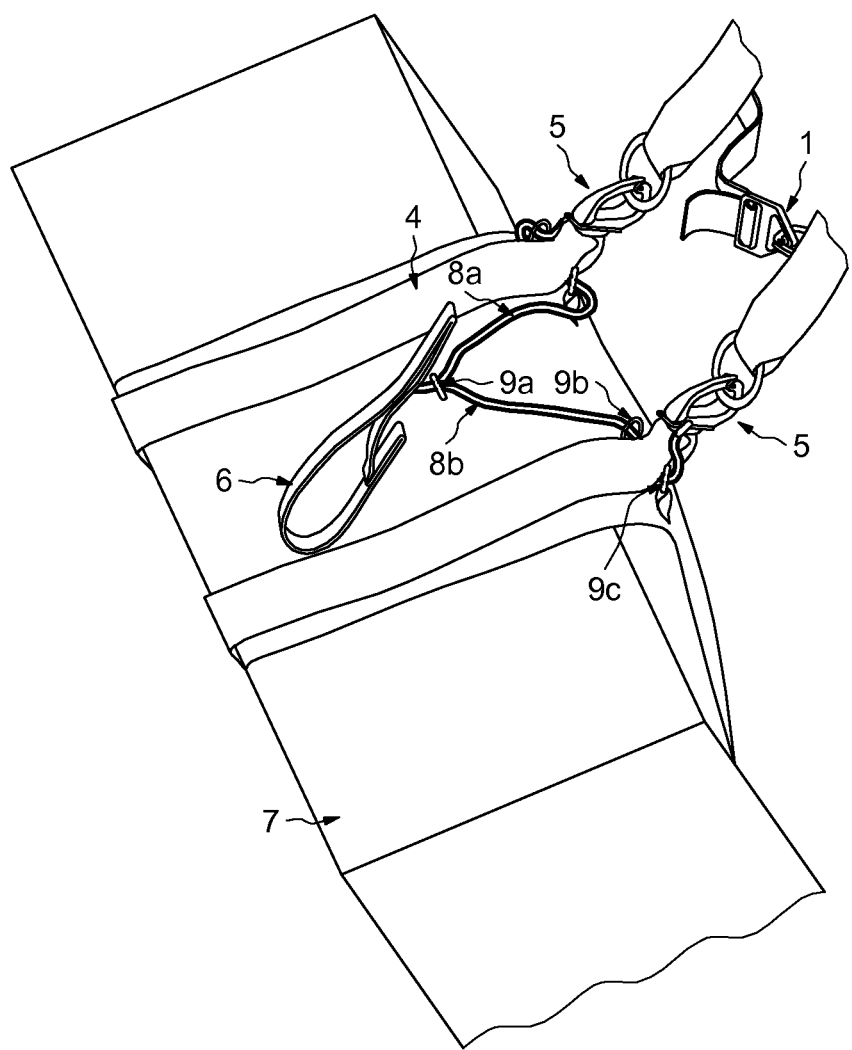
FIGS. 2 to 3 illustrate the load-carrying system linked to a portion of the harness of the parachute system according to the present disclosure with specific buckles, respectively in the closed position and in the open position, so as to enable the load-carrying system to be disconnected or dropped from the parachute system.

FIG. 2 illustrates another viewpoint of the load-carrying system 4 associated to the harness 1 for carrying a load 7, in which there are shown the mechanical connection parts 5 and the triggering means 6.

There are also shown two connecting members 8a, 8b, such as two ropes 8a, 8b, according to the presented example, each respectively connected to the release lever of the mechanical connection part 5, in particular of the specific buckle 5.

Each connecting member 8a, 8b is successively inserted into a first guide 9a and a second guide 9b before being connected to the release lever of the mechanical connection part 5. Advantageously, each connecting member 8a, 8b is successively inserted into a first guide 9a, a second guide 9b, a third guide 9c before being connected to the release lever of a mechanical connection part 5.

In order to protect the connecting members 8a and 8b from the external environment, passages are formed in the material of the load-carrying system 4 and/or of the harness 4. In particular, a first passage extends essentially between the first guide 9a and the second guide 9b. Complementarily, a second passage may extend similarly between the second guide 9b and the third guide 9c.

Thus, each connecting member 8a, 8b is provided with at least one passage, advantageously two passages, which allow(s) isolating it from the outside and protecting the user from an inadvertent opening of the load-carrying system 4.

Still with reference to FIG. 2, according to a particular embodiment, it is shown that the pathway of the second connecting member 8b is symmetrical to the pathway of the first connecting member 8a.

Thus, in a particular arrangement, it arises that the second guide 9b and/or the third guide 9c allow(s) directing the effort generated by the pull of the triggering means 6 according to an attachment axis of the mechanical connection part 5, in particular perpendicular to the release lever of the mechanical connection part 5.

Thus, regardless of the direction of the effort applied on the triggering means 6, in particular a pull on the triggering means 6, the effort is transmitted in the optimum direction with respect to the mechanical connection part 5 to ensure unlocking thereof and release the jaw from the mechanical connection part 5.

The first guide 9a allows guiding each connecting member 8a, 8b in order to make them converge into one single point so as to facilitate connection thereof to at least one triggering means 6, in particular to the unique triggering means 6.

According to one alterative, each connecting member 8a, 8b also cooperates with the third guide 9c in order to redirect the effort produced on the triggering means 6 towards the mechanical connection part 5. Indeed, regardless of the direction of the mechanical action exerted on the triggering means 6, the effort is redirected towards the mechanical connection part 5.

Finally, the second guide 9b allows adapting the circulation of the connecting member 8a, 8b to the shape of the load-carrying system 4 and/or of the harness 1 and of the passages formed in the materials of the load-carrying system 4 and/or of the harness 1.

Figure 3:
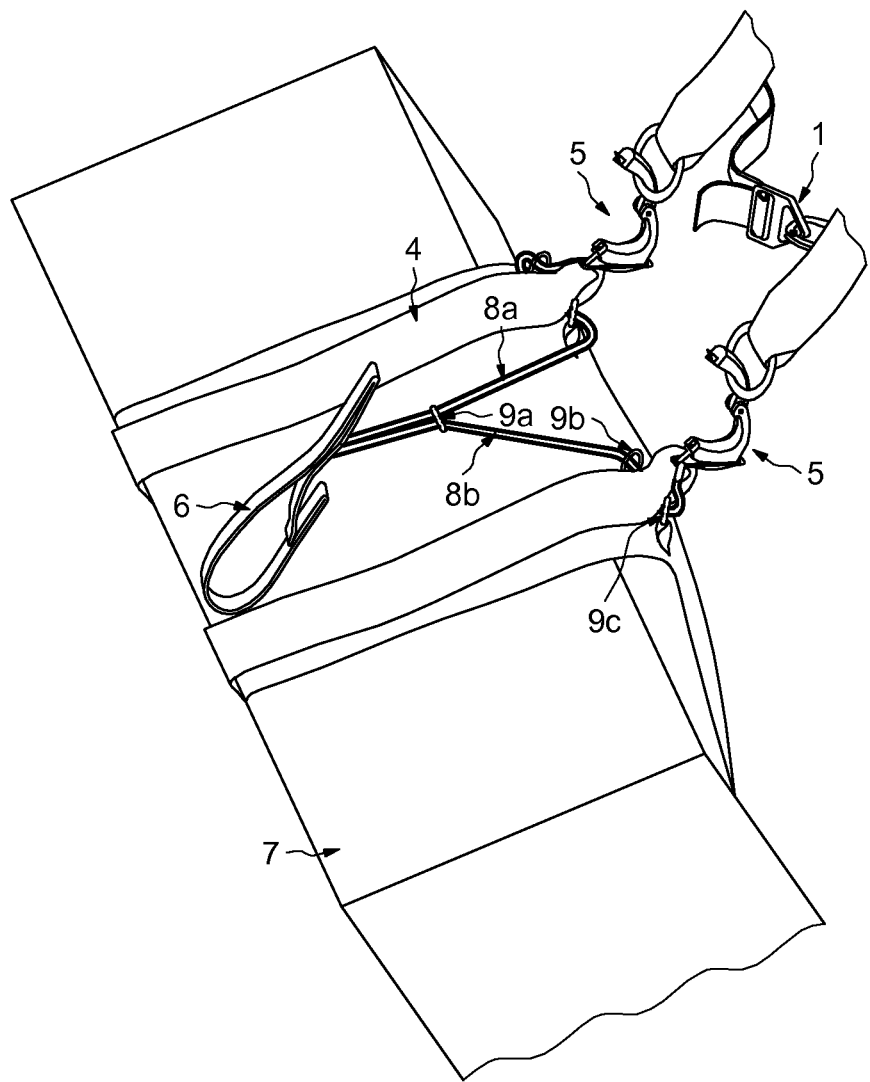

FIG. 3 is a representation similar to FIG. 2 in which there is shown the mechanical connection part 5 in the open position after action on the triggering means 6, the jaw of the mechanical connection part 5 having been released.

Figure 4:
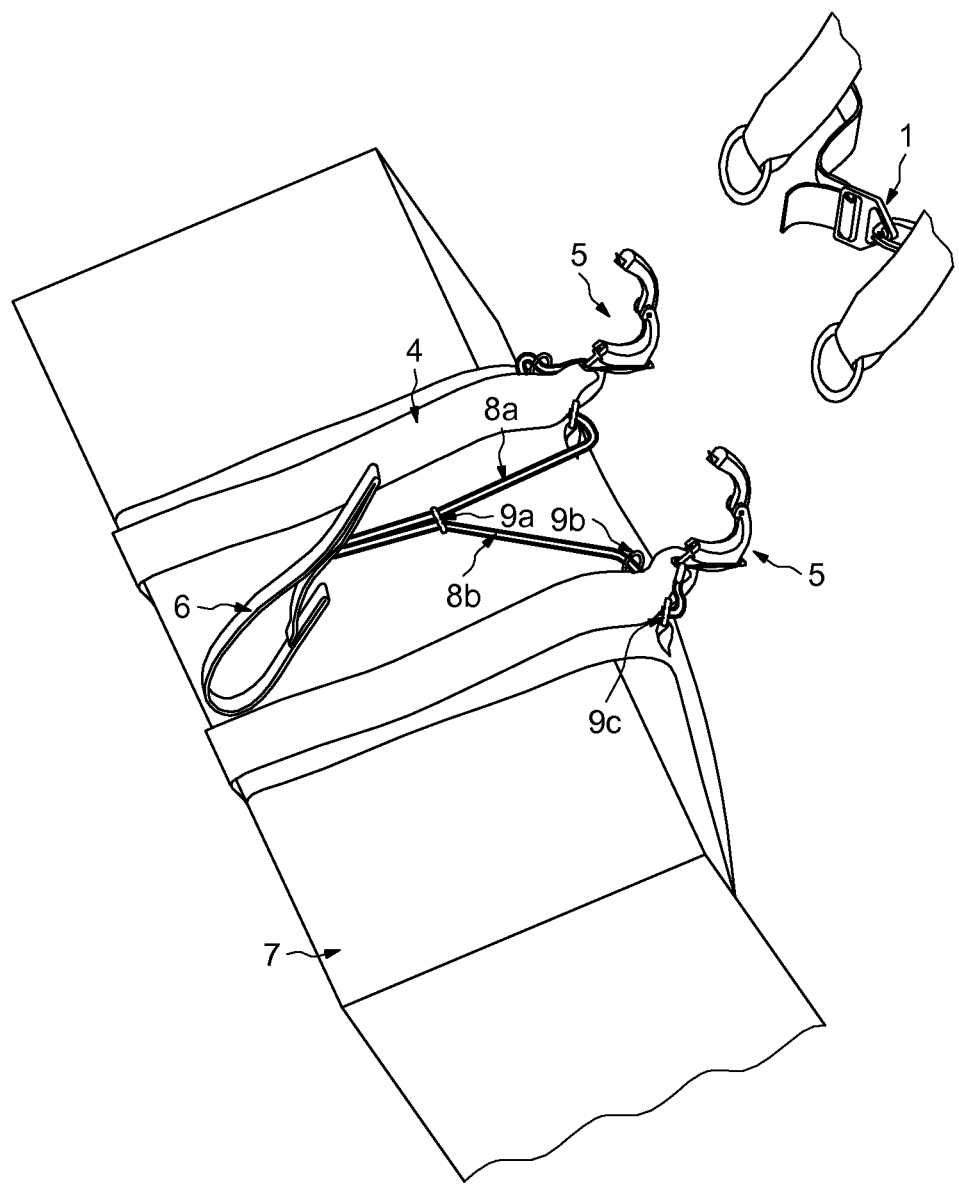
FIG. 4 illustrates the load-carrying system completely disconnected or dropped from the parachute system.

Finally, FIG. 4 is a representation similar to FIGS. 2 and 3 in which there is shown the load 7 and the load-carrying system 4 completely disconnected or dropped from the parachute system, in particular from the harness 1.

Of course, the disclosure is not limited to the previously-described embodiments provided only but as example. It encompasses various modifications, alternatives and other variants that might be considered by a person skilled in the art in the context of the present disclosure and in particular any combinations of the different previously-described operating modes, which may be considered separately or together.

The invention claimed is:

1. A device for disconnection by a mechanical action, comprising at least two mechanical connections held closed by spring action, each connected to one single triggering means via at least one connecting member, and each mechanical connection comprising a release lever configured to be triggered by application of a force according to a predefined opening direction,
   the disconnect device further comprising at least one guide for the at least one connecting member, wherein the guide is configured to redirect an effort applied on the triggering means, when opening is required, towards each mechanical connection part each linked to at least a connecting member, according to the predefined opening direction.

2. The device for disconnection by a mechanical action according to claim 1, wherein the guide is disposed in proximity to the mechanical connection part, so that the connecting member passing through the guide is collinear with the predefined opening direction in a portion comprised between the guide and the mechanical connection part.

3. The device for disconnection by a mechanical action according to claim 1, wherein the mechanical connection part is a jaw snap-hook held open by spring action.

4. The device for disconnection by a mechanical action according to claim 1, wherein the triggering means comprises one of a handle.

5. The device for disconnection by a mechanical action according to claim 1, wherein the guide is disposed in a plane equidistant from the mechanical connection parts.

6. A load-carrying system configured to hold a load in place relative to a harness, the system comprising a device configured for disconnection by a mechanical action according to claim 1, wherein the system is configured to reversibly secure the load-carrying system and the harness.

7. A load-carrying system and an associated harness according to claim 6, wherein the harness is a harness of a parachute system.

8. The device for disconnection by a mechanical action according to claim 1, wherein the at least one mechanical connection comprises a buckle.

* * * * *